(12) United States Patent
Sandstrom et al.

(10) Patent No.: US 6,720,033 B1
(45) Date of Patent: Apr. 13, 2004

(54) METHOD FOR COATING UNCURED TIRES

(75) Inventors: Paul Harry Sandstrom, Cuyahoga Falls, OH (US); Bill Bud Gross, Stow, OH (US); Douglas Andrew Till, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 37 days.

(21) Appl. No.: 10/299,448

(22) Filed: Nov. 19, 2002

(51) Int. Cl.7 .................................................. B05D 3/02
(52) U.S. Cl. ...................................................... 427/385.5
(58) Field of Search ....................................... 427/393.5

(56) References Cited

U.S. PATENT DOCUMENTS

| | | |
|---|---|---|
| 3,106,443 A | 10/1963 | Cuth bertsoon et al. |
| 3,595,950 A | 7/1971 | Mezynski |
| 4,072,645 A | 2/1978 | Cogley, Jr. |
| 4,253,994 A | 3/1981 | Zakaria et al. |
| 4,329,265 A | 5/1982 | Hallenbeck |
| 4,722,379 A | 2/1988 | Botzman |
| 4,857,397 A | 8/1989 | Mowdood et al. |
| 6,109,322 A | 8/2000 | Benzing, II et al. |

FOREIGN PATENT DOCUMENTS

WO    WO 02 / 45942    *  6/2002

\* cited by examiner

*Primary Examiner*—Erma Cameron
(74) *Attorney, Agent, or Firm*—John D. DeLong

(57) ABSTRACT

A method of coating a tire, comprising the steps of applying to an outer surface of a green tire: a precure paint essentially free of curatives, the precure paint comprising 100 parts by weight of elastomer, and from about 2000 to about 4000 parts by weight of an organic solvent.

19 Claims, No Drawings

METHOD FOR COATING UNCURED TIRES

TECHNICAL FIELD

The present invention is directed to a method of coating green or uncured tires. More specifically, the present invention is directed to a method of coating green or uncured tires with a solvent based precure paint essentially free of curatives.

BACKGROUND OF THE INVENTION

Conventionally, pneumatic rubber tires are produced by molding and curing a green, or uncured, tire in a molding press in which the green tire is pressed outwardly against a mold surface by means of an inner fluid expandable bladder. By this method, the green tire is shaped against the outer mold surface which typically defines the tire's tread pattern and configuration of sidewalls. By application of heat, the tire is cured. Generally, the bladder is expanded by internal pressure provided by a fluid such as hot gas, hot water and/or steam which also participates in the transfer of heat for curing or vulcanization purposes. The tire is then usually allowed to cool somewhat in the mold, sometimes aided by added cold or cooler water to the internal surface of the bladder. Then the mold is opened, the bladder collapsed by removal of its internal fluid pressure and the tire removed from the tire mold. Such tire curing procedure is well known to those having skill in such art.

It is recognized that rubbery polymers sometimes have a tendency to stick or adhere somewhat to vulcanization or curing mold surfaces and can, therefor, be somewhat difficult to remove from the mold surface after the vulcanization procedure in the mold is completed. Sometimes the mold surface itself is treated with a release agent to reduce the sticking tendency, if present and sometimes the outer unvulcanized rubber itself (such as, for example, the sidewall and tread area of an unvulcanized tire) is coated with a coating of a release composition sometimes referred to as a precure paint, precure coating, or a precure cement. Alternatively, by more accurately designing or building the components of the tire and by more definitely designing the tire mold itself, often a precure paint and/or mold release agent is not needed. However, for some tire manufacturing purposes a tire precure coating on its outer surface is still considered desirable.

Thus, a precure coating, if used, is appropriately applied to the outside surface of unvulcanized rubbery product such as a tire prior to its molding and curing. A preferred precure coating is one which will not remain, even in part, on the surface of the mold when the rubbery product is released from the mold after vulcanization. Such mold buildup of the precure coating on the mold surface can be undesirable since it can require a periodic cleaning of the mold. An ideal precure coating should allow the portion of the rubbery product in proximity to the surface of the mold to flow without restriction and without the formation of surface defects such as cracks, air bubbles or voids in the surface of the rubber during the vulcanization step so as to result in a smooth surface. It is also desirable that the precure coating itself forms a smooth coating on the rubber product. This provides the product with a presentable appearance, and also may help to prevent subsequent cracking of the rubber product due to oxygen and/or ozone attack.

Various coatings have been used in the past. These include, for example, both water and organic solvent based precure paints. Water based precure paints are disclosed in U.S. Pat. Nos. 4,072,645; 4,352,994; 4,329,265; and 4,857,397. Organic solvent-based precure paints are disclosed in U.S. Pat. Nos. 3,106,443 and 3,595,950.

With the use of organic solvent based precure paints, it is sometimes observed that during curing of a green tire coated with the precure paint there is a tendency to trap precure paint between laminates due to mold flow and wicking. Tire build from laminates is disclosed for example in U.S. Pat. No. 6,109,322. Trapped precure paint between laminates can cause a decrease in adhesion (delamination) at the edge of the laminates and visible laminate lines in a cured tire. One potential solution to eliminating delamination and visible laminate lines is to develop a precure paint which is more compatible with and a better color match to the compounds with which it is used.

SUMMARY OF THE INVENTION

There is disclosed a method of coating a tire, comprising the steps of applying to an outer surface of a green tire: a precure paint essentially free of curatives, the precure paint comprising 100 parts by weight of elastomer, and from about 2000 to about 4000 parts by weight of an organic solvent.

DETAILED DESCRIPTION OF THE INVENTION

Typical prior art formulations for organic solvent based precure paints are as disclosed in U.S. Pat. Nos. 3,106,443 and 3,595,950, wherein is it taught that an organic solvent based precure paint may generally have the formulation including sulfur as given in Table 1.

TABLE 1

Typical Prior Art Precure Paint Formulation

| Rubber Compound | Parts by Weight |
| --- | --- |
| Elastomer | 100 |
| Process Oil | 2–5 |
| Stearic Acid | 2–30 |
| Carbon Black | 150–350 |
| Talc | 0–150 |
| Zinc Stearate | 0–50 |
| Zinc Oxide | 0–5 |
| Sulfur | 1–5 |
| Accelerator | 0.5–3 |
| Antioxidant | 1–2 |
| Organic Solvent | 2000–4000 |

Typically, natural rubber, styrene-butadiene rubber (SBR) and EPDM are used as elastomers. It has now been found that by using an organic solvent based precure paint essentially free of sulfur or other curatives, delamination of a green tire is substantially reduced or eliminated. Adhesion between laminates is improved in a tire coated with the precure paints of the present invention, as compared with solvent-based paints containing curatives.

While not wishing to be bound by any particular theory, it is believed that the sulfur and other curatives present in the rubber compound of the green tire migrates or otherwise is made available to the coating of precure paint. Thus, during cure of the green tire, the precure paint is autogeneously cured utilizing the curatives at or near the surface of the tire rubber compound.

Autogeneous curing or auto-vulcanization is not unknown. U.S. Pat. No. 4,857,397 discloses a method for coating tires using a water-based precure paint, wherein the paint may contain no sulfur and the coating may be autogeneously cured upon curing of the green tire. U.S. Pat. No. 4,722,379 discloses a method for decoratively coating a vulcanized tire with a solvent based coating material that does not contain sulfur, but contains vulcanization accelerators. It is taught therein that free sulfur in the vulcanized tire is utilized in the auto-vulcanization of the coating upon cure of the coating. However, neither of these references disclose the use of a solvent-based precure paint that is essentially free of curatives.

The present method comprises coating a green tire with an organic solvent-based precure paint that is essentially free of curatives. By essentially free of curatives, it is meant that no curatives have been added to the formulation. As will be apparent to one of skill in the art, some residual amounts of curatives may be present in the various components added to the precure paint, as a result of handling or otherwise in the manufacturing and distribution processes associated with the various materials. Generally, less than 0.1 parts by weight of sulfur per 100 parts by weight of elastomer, and preferably no sulfur, is present in the precure paint.

The precure paint contains at least one elastomer suitable for use in a tire. In one embodiment, suitable elastomers include natural rubber, synthetic polyisoprene rubber, styrene-butadiene rubber, or ethylene propylene diene rubber (EPDM). In another embodiment, suitable elastomers include natural rubber and synthetic polyisoprene rubber. In another embodiment, the elastomer is natural rubber. In another embodiment, the elastomer is synthetic polyisoprene rubber.

Suitable solvents include any organic solvents for elastomers. Suitable solvents include any organic solvent suitable for use in rubber paints and cements, including but not limited to aliphatic, aromatic, and mixed aliphatic and aromatic solvents. Suitable solvents are available for Shell Chemical under the trademark SHELLSOL. Suitable aliphatic solvents may include linear and cyclic paraffins and mixtures thereof. In one embodiment, the solvent may be a low boiling point solvent comprising paraffins and cycloparaffins in the $C_5$–$C_8$ range with a low aromatics content. In one embodiment, the solvent may contain 50 to 60 percent by weight of cycloparaffins.

Solvent is present in the precure paint in a concentration range sufficient to give the paint a workable consistency, such that the paint may be applied to the surface of a green tire using any of the application methods known in the art. In one embodiment, solvent is present in a concentration range of from about 2000 to 4000 phr. In another embodiment, solvent is present in an amount sufficient to give a solids, or non-solvent, content in the paint of from about 15 to about 20 percent by weight.

Fillers may be present in the precure paint to aid in air bleed characteristics. It is believed that the presence of certain coarse fillers, such as carbon black or talc, act to aid in the movement of air released during cure of a tire. The air must move freely from the tire to the vents or other escape routes through the mold, to avoid entrapment in the tire and subsequent formation of surface defects. In one embodiment, from about 200 to about 500 parts by weight of at least one coarse filler selected from the group consisting of carbon blacks and talcs may be present in the precure paint. In another embodiment, from about 50 to about 150 parts by weight of talc, and from about 150 to about 350 parts by weight of carbon black may be present in the precure paint.

Other components may be present in the precure paint, as are known in the art, including any of the components as listed in Table 1, but not including curatives such as sulfur, sulfur donors or cure accelerators, except as noted above.

The precure paint may be applied to the surface of an uncured tire using any of the various application methods as are known in the art, including but not limited to spraying, brushing, dipping, and wiping. In one embodiment, the precure paint may be applied to all external surfaces of a green tire, including both the tread and sidewall areas. In another embodiment, the precure paint may be applied selectively to one area of a tire, such as only the tread area, or only the sidewall area.

After application, the tire is cured using methods as are known in the art.

The invention is further illustrated by the following non-limiting examples.

EXAMPLE I

In this example, the effect of several precure paints on the interfacial adhesion of a rubber compound to itself is illustrated. The adhesion value of a rubber compound to itself is an indication of the tendency of laminates in a tire to adhere and to display interlaminate lines, or delaminations, due to poor adhesion.

Four experimental precure paints were evaluated for their tendency to affect the adhesion of a rubber compound to itself. These precure paints follow the general precure paint formulation as indicated in Table 1, with the exception of the elastomer used and the presence or absence of curatives including sulfur and accelerators, as shown in Table 2.

Each of the experimental precure paints was applied to the surface of an uncured rubber compound sheet. A second untreated sheet was then laid over the treated surface to form a laminate, with one end of the laminate separated by a release ply. Following curing of the laminate, test samples were cut and the interfacial adhesion at 95° C. determined by separating the two compound layers cured together at a 180 degree angle with a force displacement machine. Results of the adhesion, or peel adhesion, tests are given in Table 2.

The rubber compound included natural rubber, polybutadiene, and standard additives and curatives.

TABLE 2

| Sample | Paint Elastomer | Curatives Present | Adhesion, N |
| --- | --- | --- | --- |
| 1 | natural rubber | yes | 143.7 |
| 2 | natural rubber | no | 157.3 |
| 3 | no precure paint | — | 151.9 |

As shown in Table 2, acceptable adhesion was observed for all samples. Surprisingly good adhesion was observed for the samples made with precure paint having no curatives present.

EXAMPLE II

In this Example, the effect of several precure paints on the interfacial adhesion of a rubber compound to itself is illustrated, along with the effect of the precure paint on air bleed during curing of a tire. Samples were prepared following the procedure of Example I, with precure paints as shown in Table 3. Additionally, green tires made using rubber compound were treated with the precure paints, followed by a standard cure cycle. Results of air bleed were judged qualitatively, with good indicating acceptable air bleed and few or no surface defects, and poor indicating unacceptable air bleed and excessive surface defects.

TABLE 3

| Sample | Paint Elastomer | Curatives Present | Adhesion, N | Air Bleed |
|---|---|---|---|---|
| 4 | natural rubber/SBR | yes | 5.0 | good |
| 5 | natural rubber | no | 135.4 | good |
| 6 | water based | yes | 173.7 | poor |
| 7 | no paint | — | 191.6 | poor |

As shown in Table 3, the desirable combination of good adhesion and good air bleed was observed only for the precure paint having no curatives and an organic solvent.

As can be seen from the examples, the use of a precure paint having no curatives present in the paint is effective in both obtaining good adhesion between laminates and in obtaining good air bleed. While not wishing to be bound by any theory, it is believed that in precure paints containing curatives, cure of the paint layer occurs before air bleed and knitting of laminate layers is complete. By contrast, using a precure paint in an organic solvent and without curatives as in the method of the present invention, the onset of cure of the paint is delayed, with cure of the paint layer occurring only upon the action of curatives present in the tire compound. The delay in cure of the precure paint allows the paint and tire compound to flow more freely during the cure process, thus allowing for better air bleed during the cure process and allowing for proper knitting between the laminates.

What is claimed is:

1. A method of coating a tire, comprising the steps of:
   applying to an outer surface of a green tire: a precure paint essentially free of curatives; said precure paint comprising:
   100 parts by weight of elastomer; and
   from about 2000 to about 4000 parts by weight of an organic solvent; and
   autogeneously curing said applied precure paint with said green tire.

2. The method of claim 1, wherein said elastomer is at least one member selected from the group consisting of natural rubber, synthetic polyisoprene rubber, styrene-butadiene rubber, and ethylene propylene diene (EPDM) rubber.

3. The method of claim 1, wherein said elastomer is at least one member selected from the group consisting of natural rubber and synthetic polyisoprene rubber.

4. The method of claim 1, wherein said elastomer is natural rubber.

5. The method of claim 1, wherein said elastomer is synthetic polyisoprene rubber.

6. The method of claim 1, wherein said organic solvent comprises a mixture of linear and cyclic $C_5$–$C_8$ paraffins.

7. The method of claim 1, wherein said precure paint further comprises from about 200 to about 500 parts by weight of a coarse filler.

8. The method of claim 1, wherein said precure paint further comprises from about 200 to about 500 parts by weight of at least one coarse filler selected from the group consisting of carbon blacks and talcs.

9. The method of claim 1, wherein said precure paint further comprises from about 50 to about 150 parts by weight of talc, and from about 150 to about 350 parts by weight of carbon black.

10. The method of claim 1, wherein said precure paint is essentially free of curatives selected from group consisting of sulfur, sulfur donors, and accelerators.

11. The method of claim 1, wherein said outer surface is at least one surface selected from sidewall surface and tread surface.

12. The method of claim 1, wherein said outer surface is a sidewall surface.

13. The method of claim 1, wherein said precure paint comprises less than 0.1 parts by weight of sulfur.

14. A tire coated using the method of claim 1.

15. A method of coating a tire, comprising the steps of:
   applying to an outer surface of a green tire: a precure paint essentially free of sulfur and cure accelerators; said precure paint comprising:
   100 parts by weight of an at least one elastomer selected from natural rubber and synthetic polyisoprene rubber;
   from about 50 to about 150 parts by weight of talc;
   from about 150 to about 350 parts by weight of carbon black; and
   from about 2000 to about 4000 parts by weight of an organic solvent; and
   autogeneously curing said precure paint with said green tire.

16. The method of claim 15, wherein said precure paint comprises less than 0.1 parts by weight of sulfur.

17. The method of claim 15, wherein said outer surface is at least one surface selected from sidewall surface and tread surface.

18. The method of claim 15, wherein said outer surface is a sidewall surface.

19. A tire coated using the method of claim 15.

* * * * *